(12) United States Patent
Ickman et al.

(10) Patent No.: US 11,151,333 B2
(45) Date of Patent: Oct. 19, 2021

(54) CONVERSATIONAL EVENT MODELING

(71) Applicant: Microsoft Technology Licensing, LLC, Redmond, WA (US)

(72) Inventors: Steven Wayne Ickman, Snoqualmie, WA (US); Thomas Matthew Laird-McConnell, Kirkland, WA (US); Christopher Clayton McConnell, Redmond, WA (US); Carlos Castro, Redmond, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 184 days.

(21) Appl. No.: 16/437,856

(22) Filed: Jun. 11, 2019

(65) Prior Publication Data

US 2020/0394272 A1  Dec. 17, 2020

(51) Int. Cl.
| | |
|---|---|
| *G06F 17/00* | (2019.01) |
| *G06F 40/44* | (2020.01) |
| *G06N 5/04* | (2006.01) |
| *H04L 12/58* | (2006.01) |
| *G06F 40/56* | (2020.01) |
| *G06F 40/279* | (2020.01) |

(52) U.S. Cl.
CPC ............ *G06F 40/44* (2020.01); *G06F 40/279* (2020.01); *G06F 40/56* (2020.01); *G06N 5/043* (2013.01); *H04L 51/02* (2013.01)

(58) Field of Classification Search
None
See application file for complete search history.

(56) References Cited

U.S. PATENT DOCUMENTS

| | | | |
|---|---|---|---|
| 9,311,298 B2 * | 4/2016 | Sarikaya | G06F 40/35 |
| 10,162,814 B2 | 12/2018 | Jiao et al. | |
| 10,261,774 B2 | 4/2019 | Chatterjee | |
| 10,387,463 B2 * | 8/2019 | Campbell | G10L 15/1822 |
| 10,424,302 B2 * | 9/2019 | Shah | G10L 15/16 |
| 10,498,673 B2 * | 12/2019 | Zhang | H04L 51/02 |
| 10,740,370 B2 * | 8/2020 | Campbell | G06F 40/35 |
| 2018/0189266 A1 | 7/2018 | Venkataraman et al. | |

(Continued)

OTHER PUBLICATIONS

"Non Final Office Action Issued in U.S. Appl. No. 16/437,906", dated Mar. 31, 2021, 10 Pages.

(Continued)

*Primary Examiner* — Satwant K Singh
(74) *Attorney, Agent, or Firm* — Holzer Patel Drennan

(57) ABSTRACT

Conversational event modeling for determining how to process an input in a dialog stack of a computer-executed conversational system. Receipt of an input at an active dialog in a dialog stack may result in generation of an event corresponding to the input. The event may be propagated through the dialog stack. Dialogs in the dialog stack may generate a confidence value in relation to processing the input, and selection of the dialog in the dialog stack for use in processing the input may be based at least in part on the confidence values. In turn, the conversational system may facilitate improved handling of ambiguous or unrelated inputs at dialogs by propagating the event associated with such an input through the dialog stack. The event creation and processing functions may be provided as parameters for dialogs in a modular dialog creation system.

20 Claims, 11 Drawing Sheets

(56) References Cited

U.S. PATENT DOCUMENTS

2019/0115027 A1* 4/2019 Shah ................ G10L 17/22
2019/0317994 A1 10/2019 Singh et al.
2020/0394268 A1 12/2020 Ickman et al.
2021/0110822 A1 4/2021 Pramanick et al.

OTHER PUBLICATIONS

"Notice of Allowance Issued in U.S. Appl. No. 16/437,906", dated Jul. 13, 2021, 9 Pages.

* cited by examiner

CONVERSATIONAL EVENT MODELING

CROSS-REFERENCE TO RELATED APPLICATIONS

The present application is also related to U.S. patent application Ser. No. 16/437,906 filed Jun. 11, 2019, entitled "CONVERSATIONAL AI USING ADAPTIVE DIALOGS" which is filed concurrently herewith and is specifically incorporated by reference for all that it discloses and teaches.

BACKGROUND

Computer-based conversational systems have increasingly changed the manner in which users interact with computers. For instance, tasks previously performed using traditional user interfaces in which a user interacts with user interface elements such as menu structures, forms, and the like (e.g., using a mouse, keyboard, display, touchscreen, etc.), are being replaced with conversational interfaces that allow a user to provide inputs to a computing system in a manner akin to speaking to a human assistant.

Conversational bots (or simply bots) have provided significant advances to facilitate such new conversational interaction with computers. Bots may allow a user to interact with a computing system (e.g., an operating system, applications, webpages, etc.) by providing inputs in a conversational manner using text, interactive cards or images, or speech.

Additionally, tools have been provided to assist in the generation of bots including, for example, Azure Bot Service available from Microsoft Corporation. For example, such tools may be provided in the form of a Software Developer Kit (SDK) that provide software tools, templates, or other modularly functional units to allow a developer to develop a bot for a given interaction with a user.

SUMMARY

Approaches to conversational event modeling in a computer-executed conversational system. The present disclosure includes a method that includes receiving an input at an active dialog in a dialog stack of a conversational model. The dialog stack includes a plurality of levels of dialogs. The method further includes generating an event at the active dialog based on the input and propagating the event to a plurality of dialogs at different respective levels within the dialog stack. The method also includes selecting one of the plurality of dialogs to process the event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
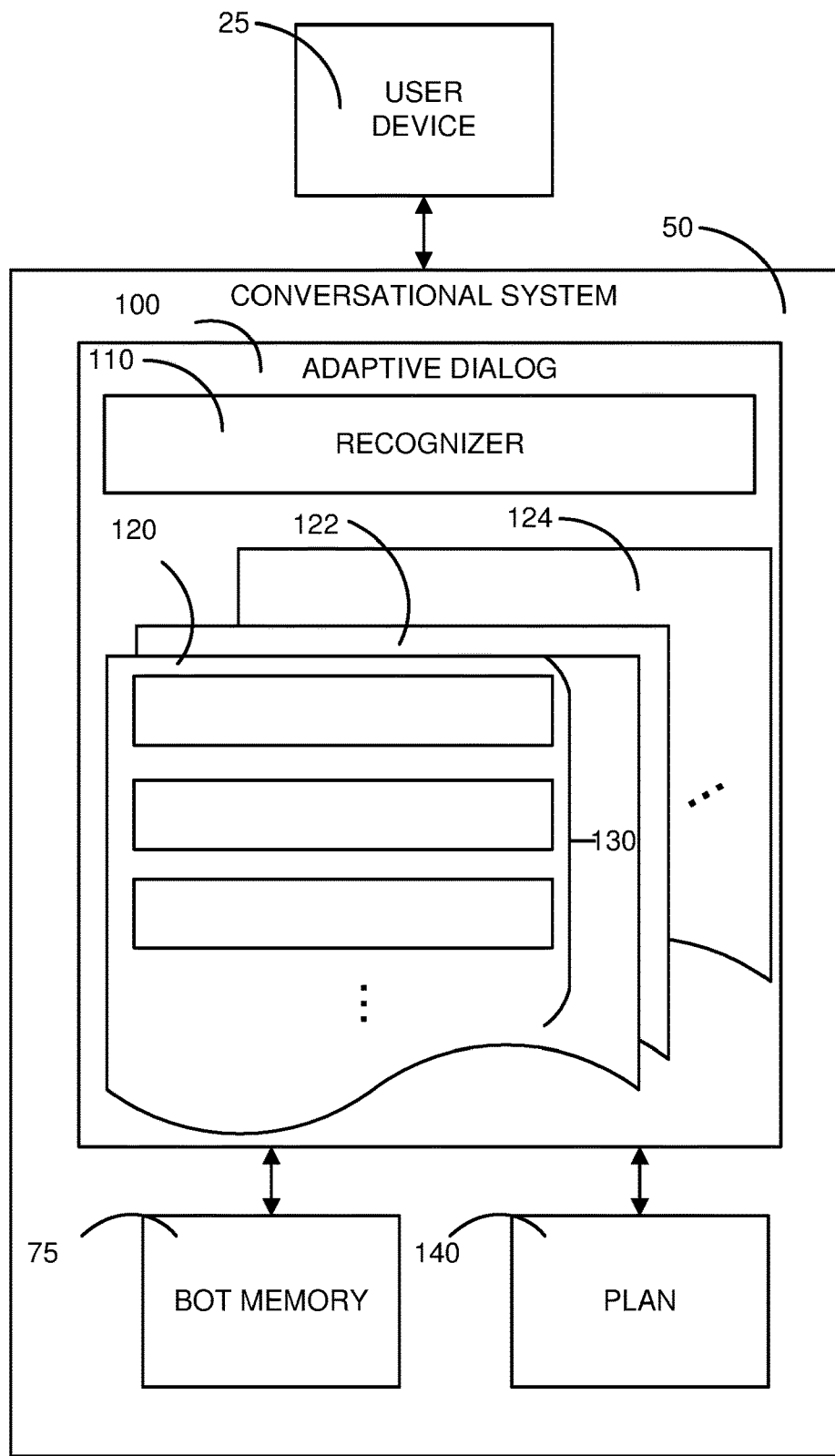
FIG. 1 illustrates an example conversational system including an adaptive dialog for generating a conversation structure.

When executing a bot or other computer-executed conversational system, processing human conversations may present difficulties given the vast unpredictability of a human user interacting with the conversational system. Human conversations tend to include complexities such as multiple levels of discussion topics or specificity. For instance, a user may say "I'd like to order a pizza." An ensuing conversational model of a conversational system related to the task of ordering a pizza may include multiple levels in a conversational structure.

For instance, one level of the conversational structure may be related to the specific order parameters of a pizza (e.g., what type of dough, sauce, and toppings are to be included in the pizza order). In order to obtain information in relation to an order, a conversational model may include multiple dialogs, such as, for example, different dialogs to determine what type of pizza, how or where to deliver the pizza, how to pay for the pizza, etc. In turn, each dialog may facilitate a specific functionality in relation to the overall function of the conversational structure. It may be appreciated that even simple tasks may be provided with a relatively complex conversational structure.

A conversational model may facilitate a conversational structure that may include a hierarchical structure to provide the informational granularity for fulfilling the order. For instance, a dialog related to ordering a pizza may have a child dialog that allows the type of pizza ordered to be defined. This dialog may include further children dialogs related to each of the parameters for dough, sauce, and toppings. In turn, a conversational structure of a bot or other computer-executed conversational system may be complex and variable.

In view of conversational human inputs, it may be difficult to model or control the manner in which a conversational system reacts to a user input that could be applicable to different levels of the conversation. Such an input may be referred to as an ambiguous input as it may not be clear as to what portion or level of the conversational structure it applies. For instance, if, during the foregoing example related to a conversational model for ordering a pizza, a user may provide an utterance of "pepperoni" to a dialog related to adding toppings to a pizza. In this context, it may be clear that the entity "pepperoni" relates to a topping to be added to the pizza (e.g., the pepperoni entity may be a prepopulated item for selection). However, should a user provide an ambiguous utterance of "help" or "cancel," it may not be clear to which portion or level of the conversational structure the utterance relates. Given the potential complexity of the conversational model it may be difficult for the conversational system to determine how to process such an input. For instance, is a user requesting to cancel a given topping of the order, does a user wish to cancel the given pizza being ordered, or does the user wish to cancel the entire order? Common ambiguous inputs in conversational system correspond to help functions and cancel functions. For instance, users often will simply provide an utterance of "help" or "cancel" without further clarification of what portion of the dialog the input relates. In this regard, examples provided herein may relate to processing utterances related to help functionality or cancel functionality, although it will be appreciated that any other function may be processed in the same manner without limitation.

Providing an approach to robustly handle such potential ambiguities in human conversation may be difficult in view of the understandably complex structure of human conversations, even for relatively simple tasks or functions. Moreover, when developing a conversational system that is provided to developers for creation of conversational models intended to be extensible and adaptable, facilitating an approach to processing user provided input in a comprehensive fashion across the entire conversational system may be exceedingly complex.

Modular platforms for generation and arrangement of dialog components in an SDK are contemplated. In such a context, the manner in which a developer will structure a conversational model may not be readily known or predictable given the flexibility of such a system provided by a modular approach to conversational modeling. Furthermore, it is highly desirable to provide easy extensibility or modification to conversational models created by such an SDK. In this regard, a need exists to provide conversational tools such as dialogs having a capability of interoperative event handling without a priori knowledge of the conversational structure.

FIG. 1 schematically depicts an example of a conversational system 50. The conversational system 50 may be in operative communication with a user device 25. In turn, the conversational system 50 may facilitate interaction with a user via the user device 25. The user device 25 may be any appropriate computing device such as a mobile device, a laptop computer, a desktop computer, a smart speaker, an Internet-of-Things (IoT) smart device, a digital assistant device, or any other appropriate computing device with which a user may interact. The user device 25 may be in communication with the conversational system 50 using any appropriate means including, for example, a local connection, a connection via a network interface, or the like. Alternatively, the conversational system 50 may reside and be executable locally on the user device 25.

The conversational system 50 may include and/or execute an adaptive dialog 100. The adaptive dialog 100 may include a recognizer 110, one or more conversational rules 120, and one or more steps 130. The one or more steps 130 may be associated with a given conversational rule 120. In addition, any or all of the steps 130 may comprise a dialog, thus enabling a hierarchical, tiered, or multilevel dialog structure referred to as a dialog stack as will be described in greater detail below.

The conversational system 50 may include a bot memory 75 for storing and tracking conversations (e.g., data corresponding to inputs, states, or the like) with a user of the user device 25. The bot memory 75 may be implemented as any type of computer readable storage media, including volatile or non-volatile memory. The conversational system 50 may be executed on any appropriate computing device described in greater detail below.

The recognizer 110 may be operative to extract data from input received at the adaptive dialog 100. For instance, the recognizer 110 may receive an input and may generate an output that reflects the input in a form or schema for the adaptive dialog 100. The output of the recognizer may comprise a trigger. A trigger output by the recognizer 110 may be treated as an event received at the adaptive dialog 100. For instance, the recognizer 110 may receive an input from a user in the form of speech, typed text, or another user input. The recognizer 110 may process the input to output the trigger. The trigger may comprise an intent recognized by the recognizer 110 from the input and/or an entity recognized by the recognizer 110 from the input.

A trigger may also comprise an event received at the adaptive dialog 100. For instance, certain components of the conversational system 50 may emit events in association with the execution of the component. For instance, other dialogs may emit events to the adaptive dialog 100, which may be processed by the adaptive dialog as a trigger. The conversational system 100 may comprise a conversational event modeling module (not shown) that may execute functionality associated with processing events in the conversational system 50. Events may be emitted or received by dialogs 100 that may be concurrently executing dialogs or dialogs comprising steps being performed in the execution of the adaptive dialog 100. For instance, a child dialog may be launched such that the operation of the parent dialog is suspended. In turn, a child dialog may emit an event that may be received by other dialogs, such as the parent dialog, given the other dialogs may not yet be ended. System events may be provided such as events that are emitted when a dialog is started; when a new activity is received; when an intent is recognized (e.g., by the recognizer 110); when an intent is not handled, recognized, or expected; when a plan is started; when a plan is saved; when a plan ends; when a plan is resumed from an interruption; when a consulting occurs; and/or when a dialog is canceled. Events may also be extensible such that developers may generate or customize events and/or event handling by the adaptive dialog 100.

The adaptive dialog 100 may also include one or more conversational rules 120. Conversational rules 120 may be consulted when a trigger (e.g., a system event or other output is emitted from the recognizer 110) is received at the adaptive dialog 100. Conversational rules 120 may comprise a condition that, when satisfied, calls the conversational rule 120 for execution by the adaptive dialog 100. The conversational rule 120 may include one or more steps 130 to execute when the conversational rule is called by the adaptive dialog 100. That is, when the condition of a conversational rule 120 is satisfied, the steps 130 of the rule may be added to a plan 140 of the conversational system 50 to be executed by the conversational system 50 for interaction with the user device 25. The plan 140 may reflect a conversational structure for the conversational system 50, which may be dynamically modified by the adaptive dialog 100 as described below.

When a trigger is received at the adaptive dialog 100, the trigger may be used to identify a conversational rule 120 in the adaptive dialog 100 that is associated with the trigger (e.g., has a condition satisfied by the trigger). An adaptive dialog 100 may include a plurality of conversational rules 120, 122, 124, etc. While three rules are depicted in FIG. 1, additional or fewer conversational rules may be provided for an adaptive dialog 100 without limitation. In this regard, conversational rules 120, 122, and/or 124 may define how the adaptive dialog 100 executes in reaction to a trigger. For instance, a conversational rule 120, 122, and/or 124 may be associated with a specific event that is emitted by any sub-system. Other conversational rules 120, 122, and/or 124 may be associated with respective intents and/or entities that may be recognized by the recognizer 110. For instance, an intent "bookFlight" may be output from the recognizer 110 from a user's statement "help me book a flight." A conversational rule 120 associated with the intent "bookFlight" may be identified in response to receipt of the intent "bookFlight." Additionally or alternatively, conversational rules 120, 122, and/or 124 may be associated with entities. For instance, when an input of "when is Mom's birthday?" is received, the recognizer 110 may determine an entity "Mom" associated with the user's mother (e.g., from the user's contacts). Identification of the entity "Mom" may be associated with a conversational rule 122 that may execute when the entity "Mom" is recognized. Other associations between conversational rules 120, 122, and/or 124 and intents, entities, or events may be provided without limitation.

Conversational rules 120, 122, and/or 124 may include steps 130, such that when a rule is called or invoked (e.g., by satisfaction or matching of a condition for the conversational rule 120), the steps 130 for the conversational rule 120 may be added to the plan 140 maintained by the conversational system 50. While conversational rule 120 is shown as including three steps 130, additional or fewer steps 130 may be provided without limitation. Moreover, different conversational rules 120, 122, and/or 124 may include a different number of steps. Accordingly, conversational rule 120, 122, and/or 124 may include one or more steps 130. Steps 130 comprise dialog primitives that may be used to control the flow of the conversation system 50. Specifically, steps 130 may provide certain defined functionality. Examples of functionality facilitated by a step 130 may include, but are not limited to, sending a response, tracing and logging actives, memory manipulation, conversational flow and dialog management, eventing, or custom defined functionally, which may be extensible. A step 130 may send a response by facilitating the ability to send an activity to a user. The activity can be a string or an object. A step 130 may provide tracing and logging activities by facilitating a declarative step used to emit a trace that gets routed as a transcript to provide logging for the bot executing the adaptive dialog 100 in the conversational system 50. A step 130 may provide memory manipulation by facilitating a declarative or a set of declaratives that allow manipulation of a bot's memory. For instance, a step 130 may be used to save a memory property as an entity, edit an array in memory, initial a property to either an object or an array, set memory to the value of an expression, remove a property from memory, or perform some other action in relation to the memory for the bot.

Steps 130 may also provide conversational flow and dialog management. That is, steps 130 may control the flow of a given set of steps (e.g., within a plan of the conversational system 50). For instance, a step 130 may be provided that facilitates inspection of memory and can branch between dialogs based on a condition evaluated relative to the memory. A step 130 may conditionally determine which of a plurality of steps 130 to execute next (e.g., after completion of a prior step). A step 130 may be used to begin another dialog. As will be described in greater detail below, this may allow a dialog (e.g., the adaptive dialog 100) to launch one or more sub-dialogs or child dialogs that may execute to add steps 130 to the plan 140 of the conversational system 50. In some examples, upon completion of a child dialog called by a parent dialog, execution may return to the parent dialog that called the child dialog to begin. A parent dialog may receive an input that causes a child dialog or intervening dialog to launch. Upon completion of the child dialog or intervening dialog, the parent dialog may resume execution. In other examples, flow of the plan may be otherwise manipulated to define a sequence of steps 130 in the plan. A step 130 may be provided to end a dialog. In this case, upon ending a dialog, a result may be returned to a parent or calling dialog. Another step 130 may be provided to cancel all dialog steps. For instance, such a step may emit an event that propagates through an entire dialog stack to cancel all current dialogs (e.g., any active dialog that has commenced, but not completed). Conditions may be placed on the propagation of the cancellation event emitted by such a step to allow for selective cancellation of certain active dialogs (e.g., at a given level in a dialog hierarchy or the like) as will be described in greater detail below. Also, a step 130 may be used to replace a step 130 with another step 130. Upon replacement of a step 130, the step 130 replacing the existing step 130 may bind its result to memory. Steps 130 may also provide extensibility such as allowing for execution of custom code or making other appropriate calls (e.g., HTTP calls, API calls, or the like).

Furthermore, steps 130 may be used for obtaining an input or model interactions with a user. For instance, a step 130 may prompt a user for an input. The prompted input may comprise a text input, an integer input, a floating point input, a choice of one or more options presented, and/or a confirmation of an input (e.g., providing a yes/no choice to the user to confirm a prior input).

Figure 2:
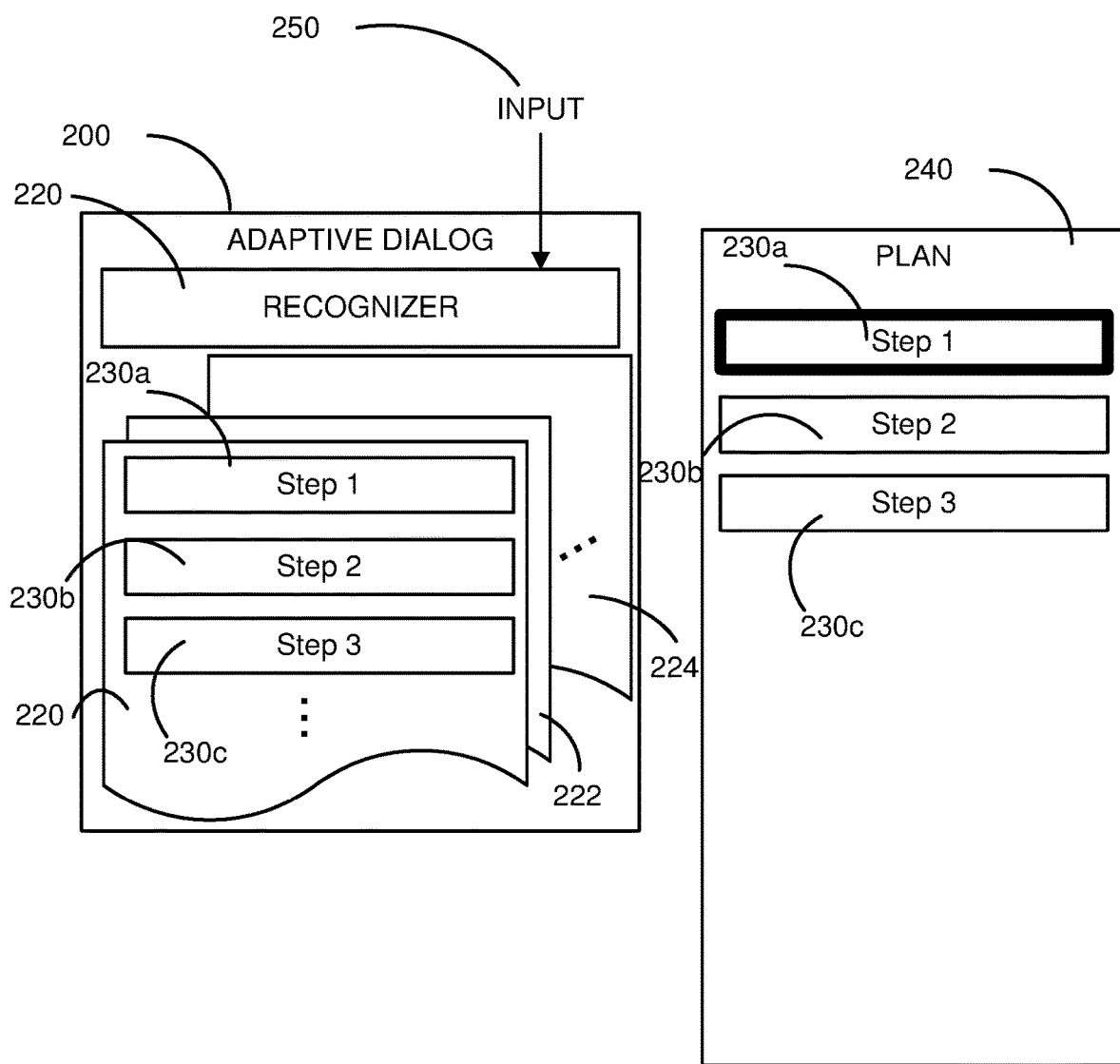
FIG. 2 illustrates an example adaptive dialog for generating a conversation structure of a conversational system by adding steps to a plan for the conversational system.

As briefly referenced above, upon satisfaction of a condition of a conversational rule 120, 122, and/or 124 (e.g., in response to a trigger), the steps 130 for the conversational rule 120 may be added to a plan 140. With further reference to FIG. 2, interaction between a conversational rule 220 and a plan 240 is illustrated. FIG. 2 includes a plan 240, which may exist in memory of a conversational system. As can be appreciated, an input 250 may be provided to a recognizer 210 of an adaptive dialog 200. The input 250 may be a typed string, speech, utterance, or other input provided by the user (e.g., via a user device). In turn, a conversational rule 220 may be identified based on a trigger generated by the recognizer 210 in response to the input 250. For instance, an intent and/or entity may be emitted by the recognizer 210 in response to the input 250. In turn, a conversational rule 220 with a condition associated with receipt of the intent and/or entity may be identified. In turn, Step 1 230a, Step 2 230b, and Step 3 230c for the conversational rule 220 may be added to (e.g., may populate) the plan 240. Also, the conversational system may commence execution of the plan 240 by commencing to perform the functionality of Step 1 230a. That is, Step 1 230a may be made the active step, as evidenced by the bold outline in FIG. 2. The plan 240 may comprise a sequence of steps 230a, 230b, 230c that are queued to be performed by the adaptive dialog 200. However, as will be appreciated in greater detail below, the adaptive dialog 200 may dynamically amend the plan 240 in response to various triggers (e.g., referred to herein as modifying triggers) received during the execution of a given step 230 in the plan 240.

Figure 3:
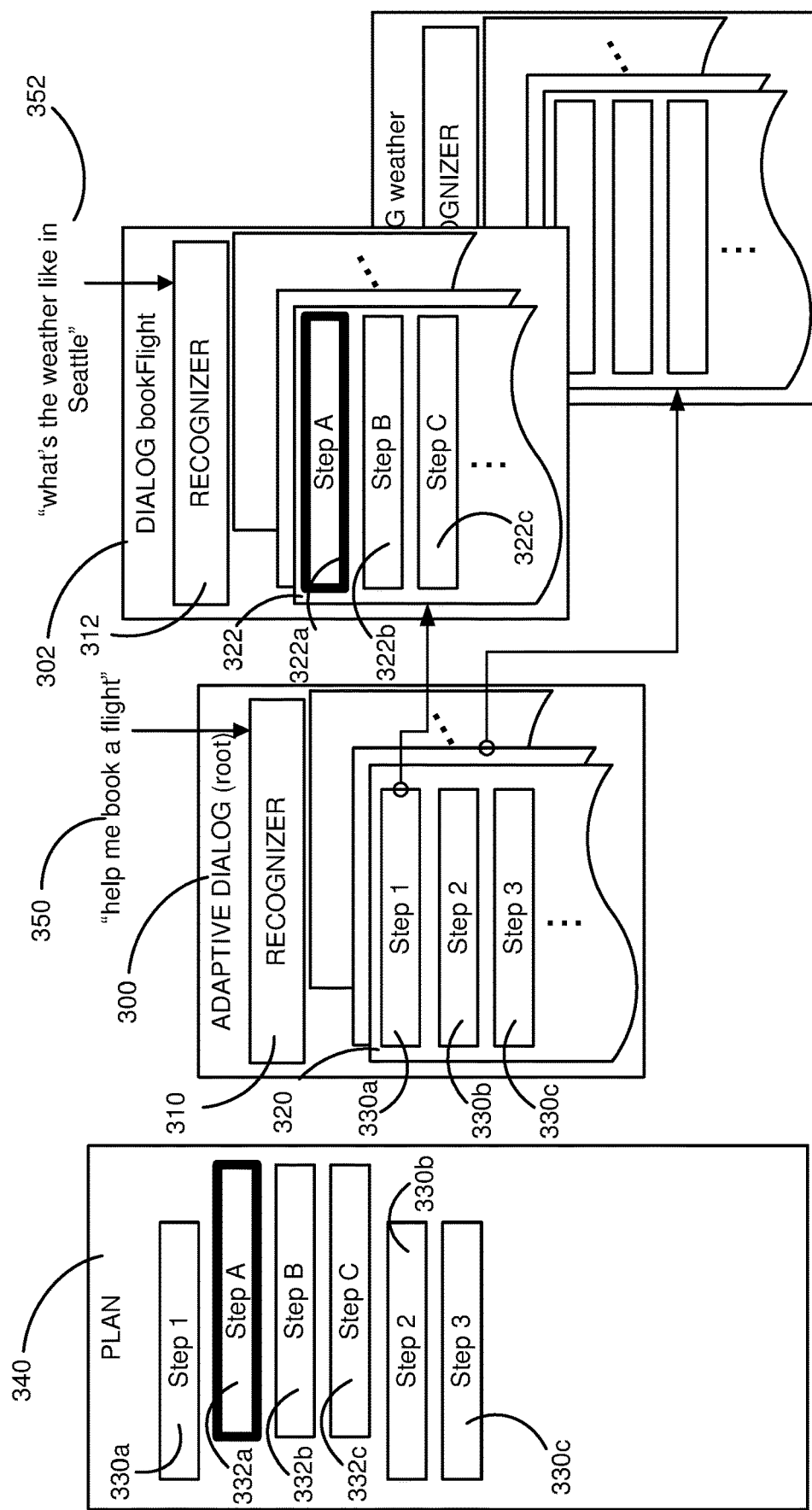
FIG. 3 illustrates an example of a hierarchical dialog structure facilitated by an adaptive dialog for dynamic control of a plan for the conversational system.

With further reference to FIG. 3, an example hierarchical dialog structure is depicted. In FIG. 3, a plan 340 that may be maintained in a memory of a conversational system is shown. A root dialog 300 (which may be an adaptive dialog)

may be provided for the conversational system. The root dialog 300 may include one or more conversational rules 320. The conversational rule 320 may include one or more steps 330a, 330b, and/or 330c. Any one or more steps 330 in a conversational rule 320 may itself comprise a dialog. In this regard, a child dialog 302 may be called upon execution of step 330a. The child dialog 302 may include a conversational rule 322. For instance, the conversational rule 322 may be triggered or called from the root dialog 300 during execution of step 330a. That is, execution of a step 330 may include launching a child dialog. In turn, multiple levels of dialogs (e.g., dialog 300, 302, etc.) may be provided as dialogs are launched upon execution of a step 330 from a parent dialog to define a dialog stack. In this regard, a root dialog 300 (e.g., an adaptive dialog) may include Step 1 330a, Step 2 330b, and Step 3 330c, which are added to the plan 340 upon execution of a conversational rule 320 of the root dialog 300. As discussed above, the plan 340 may be amended in response to various triggers as will be described below.

As an example, during Step 1 330a of the root dialog 300. An input 350 of "help me book a flight" may be received. The input 350 may be processed by a recognizer 310 to recognize an intent from the input 350. For instance, the intent may be identified as "bookFlight." This may comprise a trigger comprising the intent "bookFlight." In turn, conversational rule 322 may comprise an intent rule for the trigger "bookFlight." The conversational rule 322 may comprise Step A 332a, Step B 332b, and Step C 332c, which may facilitate an interface with a user device that allows a user to book a flight. As such, the trigger identified by the recognizer 310 from the input 350 may result in identification of conversational rule 322 related to "bookFlight." In turn, the steps 332 for the "bookFlight" conversational rule 322 may be added to the plan 340.

The amendment of the plan 340 by a conversational rule 322 may allow the plan 340 to be amended in any appropriate manner. Non-limiting examples may include that steps 332 may be added to the beginning of a plan 340 (e.g., prior to all other steps 330 currently populated in the plan 340), may be added to the end of a plan 340 (e.g., subsequent to all other steps 330 currently populated in the plan 340), may be added between existing steps 330 in the plan, or may replace one or more steps 330 that exist in the plan 340. Also, as described in greater detail below, steps 330 or 332 for a conversational rule 320 or 322 may be treated collectively (e.g., inserted into a plan as a block of steps) or individually.

Continuing the example of FIG. 3, upon identification of the "bookFlight" conversational rule 322 based on the input 350, Step A 332a, Step B 332b, and Step C 332c may be added to the plan 340 between step 1 330a and step 2 330b. While all steps for the "bookFlight" conversational rule 322 are shown as being added in consecutive order in the plan 340, this need not be the case. For instance, each of the steps 332 may be collectively treated for insertion into the plan 340 as a block or may be individually treated with respect to amending the plan 340 such that individual ones of the steps 332 may be inserted at different respective locations in the plan 340. As shown in FIG. 3, Step A 332a may be made the active step. In this regard, it may be that Step 1 330a has yet to end, in which case Step 1 330a may be suspended or temporarily halted until execution of one or more other steps 332 complete or end.

Such amendments to the plan may occur at different levels of the dialog stack shown in FIG. 3. For instance, during execution of Step A 330a, an input 352 may be received. The input 352 may be text, speech, utterance, or other input of "what's the weather like in Seattle." The input 352 may comprise a modifying trigger. For instance, the input 352 may be an unexpected input for Step A 330a. An unexpected input may be an input that does not satisfy a prompt; is not a correct variable form; corresponds to an intent, entity, or event different than that of the current rule; or includes some other indication that a condition has changed such that the active dialog and/or step are no longer immediately relevant to the user. For instance, the input 352 of "what's the weather like in Seattle" may indicate that the user's intent has changed from the intent associated with the "bookFlight" conversational rule 322. In this regard, the input 352 may invoke a consultation in which the recognizer 312 may determine if any rules in the child dialog 302 correspond with the modified trigger of the input 352. If no conversational rule 322 in the child dialog 302 corresponds with the modified trigger of the input 352, the consultation may extend to the parent dialog, which in this case is the root dialog 300. In turn, the recognizer 310 of the root dialog 300 may determine if any conversational rules 320 in the root dialog 300 correspond to the modifying trigger. For instance, the input 352 may comprise a modifying trigger related to the intent "weather." A conversational rule 324 corresponding to the intent "weather" may be identified by the root dialog 300 from the conversational rules of the root dialog 300.

Figure 4:
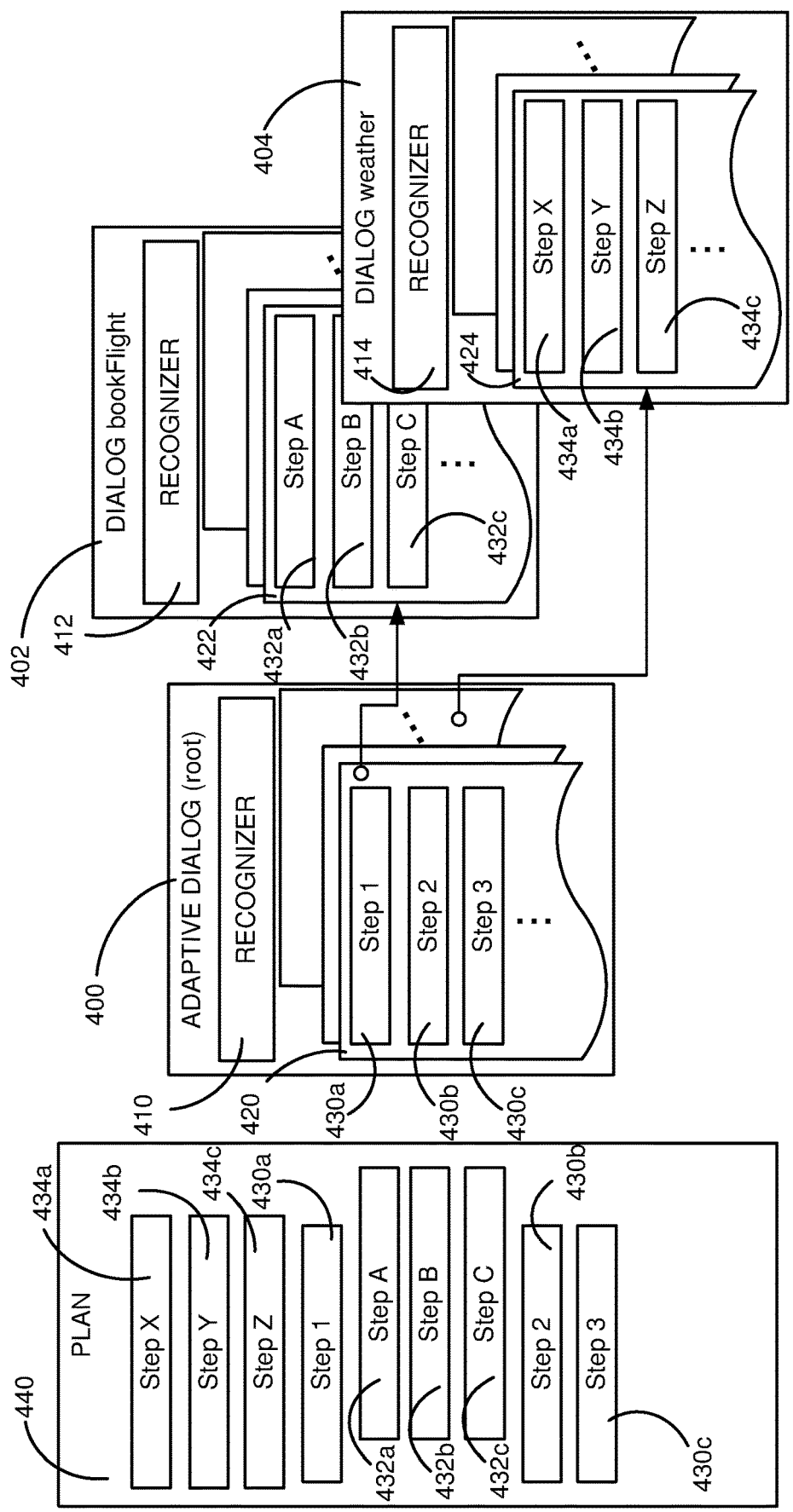
FIG. 4 illustrates an example of handling a modifying trigger received at a conversational system employing an adaptive dialog.

In turn, with further reference to FIG. 4, an example of an amendment to a plan 440 maintained in a memory of a conversational system by an adaptive dialog is shown. An adaptive dialog 400 may include one or more conversational rules 420, each of which may include one or more steps 430a, 430b, and/or 430c. In this regard, the plan 440 may be populated with steps 430a, 430b, and 430c from the conversational rule 420 of the adaptive dialog 400. A child dialog 402 may be called during execution of a step 430a. As each step 430 may itself comprise a dialog, execution of step 430a may call dialog 402. Dialog 402 may comprise a conversational rule 422. The conversational rule 422 may include one or more steps 432a, 432b, 432c. As the dialog 402 is called and the conversational rule 422 is invoked, steps 432a, 432b, and 432c may be added to the plan 440. For instance, conversational rule 422 may be associated with an intent of an input by the user.

However, during execution of the conversational rule 422, a modifying trigger may be received, which may result in identification of another conversational rule 424 of another dialog 404. For instance, a weather conversational rule 424 may be called by the adaptive dialog 400. In turn, steps for the conversational rule 424 corresponding to dialog 404 may include Step X 434a, Step Y 434b, and Step Z 434c. In turn, Step X 434a, Step Y 434b, and Step Z 434c may be added to a plan 440. As described above, a conversational rule 424 may amend the plan 440 in any manner. For instance, Step X 434a, Step Y 434b, and Step Z 434c may be added to the beginning of the plan 440. Moreover, others of the steps in the plan 440 may be suspended. Upon completion of the Step X 434, Step Y 434b, and Step Z 434c associated with the weather conversational rule 424, the plan 440 may return to the suspended steps.

Figure 5:
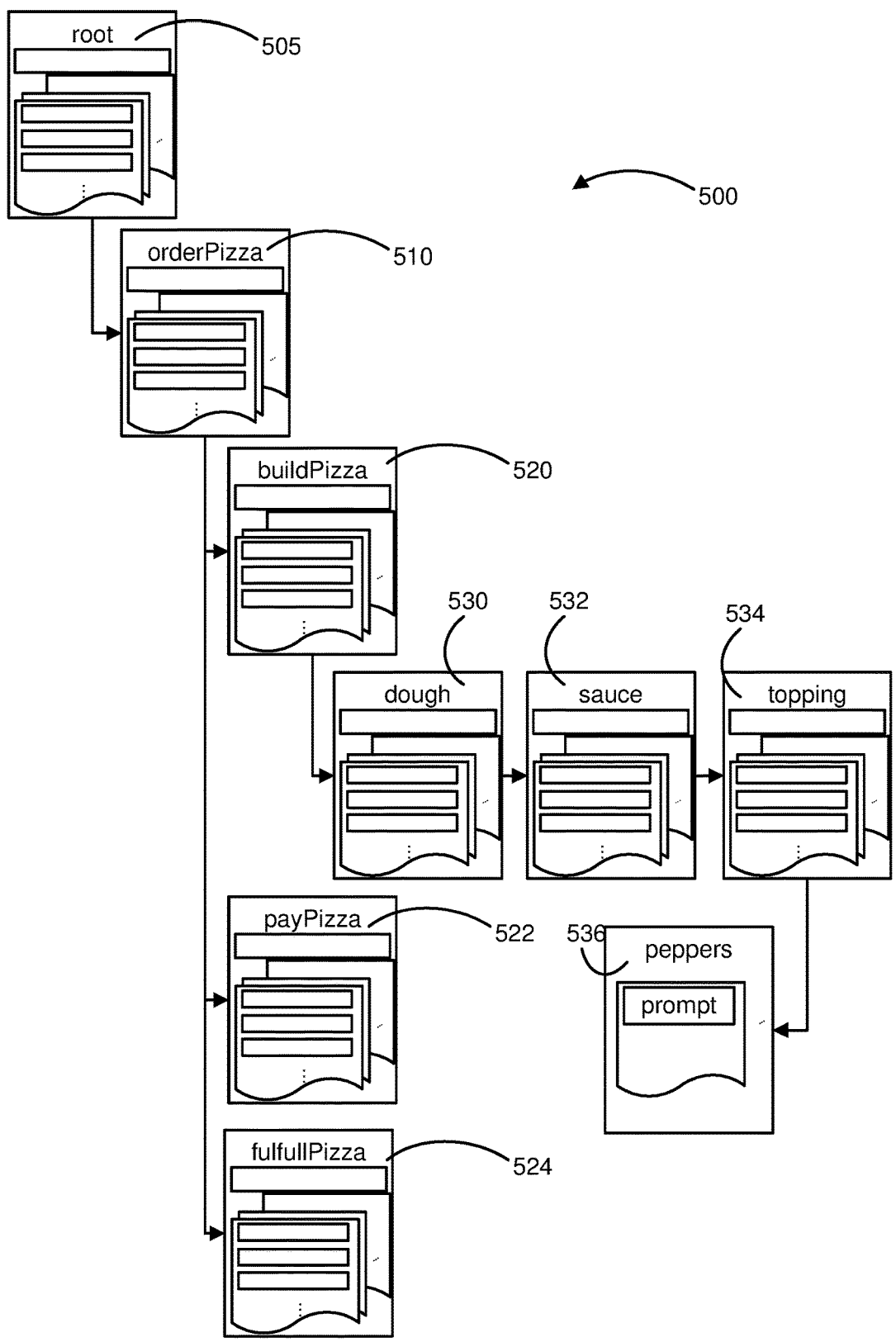
FIG. 5 illustrates another example of a hierarchical conversational structure comprising a dialog stack.

FIG. 5 illustrates another example dialog stack 500 of a conversational system. The dialog stack 500 may include a plurality of dialogs which may provide functionality related to a pizza order by a user. In this regard, the dialog stack 500 may include a root dialog 505. The root dialog 505 may be operative to receive an input from a user and identify an intent associated with ordering a pizza. In turn, the root dialog 505 may identify a conversational rule that results in the calling of a child dialog of the root dialog 505 related to ordering a pizza. As shown in FIG. 5, this child dialog may comprise an orderPizza dialog 510.

The orderPizza dialog 510 may in turn call or invoke further child dialogs to orderPizza dialog 510. For instance, a first child dialog of the orderPizza dialog 510 may be the buildPizza dialog 520. The buildPizza dialog 520 may be called in response to an input received at the orderPizza dialog 510 that a user wishes to add a pizza to the order. For instance, selection of other menu items by a user may result in other dialogs execution (e.g., a dialog for adding a salad, pasta dish, or other menu item to the order). In any regard, the buildPizza dialog 520 may call further child dialogs of the buildPizza dialog comprising a dough dialog 530 for receiving input from the user regarding the type of dough for the pizza, a sauce dialog 532 for receiving input from the user regarding the type of sauce for the pizza, and a topping dialog 534 for receiving input from the user regarding the selection of toppings for inclusion on the pizza. Further still, the topping dialog 534 may call a further child dialog. For instance if a user provides an input of "peppers" to the topping dialog 534, a peppers dialog 536 may be called as a child dialog to clarify if the user desires green peppers, red peppers, or jalapeno peppers.

The orderPizza dialog 510 may also call the payPizza dialog 522 that may execute to receive input regarding payment details from the user. While child dialogs of the payPizza dialog 522 are not shown in FIG. 5, it may be appreciated that this dialog may also call one or more levels of children dialogs to receive information for payment (e.g., including payment method, payment card number, billing address, etc.). Further still, the orderPizza dialog 510 may also call a fulfillPizza dialog 524 that may be executed to obtain fulfillment information from a user. Also while not shown in FIG. 5, it may be appreciated that the fulfillPizza dialog 524 may call further children dialogs to obtain information regarding the fulfillment of the pizza. For instance, further child dialogs may be called by the fulfillPizza dialog 524 to obtain a confirmation of whether the fulfillment type is pickup or delivery. Further children dialogs may be launched if the fulfillment type is delivery to, for example, collect the delivery address or the like.

As can be appreciated from the hierarchical structure of FIG. 5, a dialog stack 500 may include many hierarchical levels. Moreover, as a conversational system navigates through a conversational model to generate the conversational structure such as the dialog stack 500 reflected in FIG. 5, many dependent levels of dialogs may be provided as children dialogs, grandchildren dialogs, and the like. The resulting conversational structure may comprise a dialog stack 500 that may be complex with branches and a plurality of hierarchical levels. As such, when an input is received at an active dialog (e.g., a currently executing dialog, which may also be referred to as a "leaf dialog" reflecting a potential tree-like conversational structure) in the dialog stack 500, any ambiguity related to the input as to which dialog in the dialog structure the input relates may provide difficulty in processing. For instance, if a user provides an input of "cancel" during the execution of the peppers dialog 536, a user may be wishing to remove peppers from the pizza ordered (e.g., and in turn cancel the peppers dialog), the user may wish to cancel the selection of toppings executed by the toppings dialog 534, the user may wish to cancel the entire pizza currently being ordered by the buildPizza dialog 520, or the user may wish to cancel the entire order performed by the orderPizza dialog 510.

Approaches that attempt to manage the processing of inputs comprising ambiguity through predefined global rules for handling such inputs may suffer a number of drawbacks. For instance, it may be difficult to programmatically define the handling of all potential inputs given the near infinite inputs that can be provided in a human conversation. Furthermore, such rules may not easily be adaptable to a dynamic conversational model that dynamically creates a dialog stack 500 as described in FIG. 5 that is adaptive to the inputs of a user. That is, a definitive conversational structure may not be definable as the conversational model may be adaptable or responsive to user interaction with the conversational system due to potential variations in the menu items ordered, the menu items parameters received, the fulfillment details, and/or the payment details facilities by the conversational system represented in FIG. 5. As such, providing predefined event handling may not be feasible as it may not be practical to anticipate the conversational structure. In this regard, the approach described herein may rely on event generation and propagation such that the events are interpretable and interoperative with other dialogs in the dialog stack. As each dialog in the system may be configured to process events, use of events with event handling parameters or the like may greatly simplify the conversational control using conversational event modeling as described herein In turn, the present disclosure facilitates an approach to conversational event modeling. The approaches described herein may allow for robust handling of inputs in a hierarchical conversational structure. Accordingly, regardless of the complexity of the conversational structure or variability of the conversational structure, inputs received at the system that are vague, ambiguous, unexpected, or otherwise difficult to process may be processed by the conversational system to provide a more robust conversational system. This may provide ease of user interaction with such a system and more accurately reflect common human conversational interaction.

Figure 6:
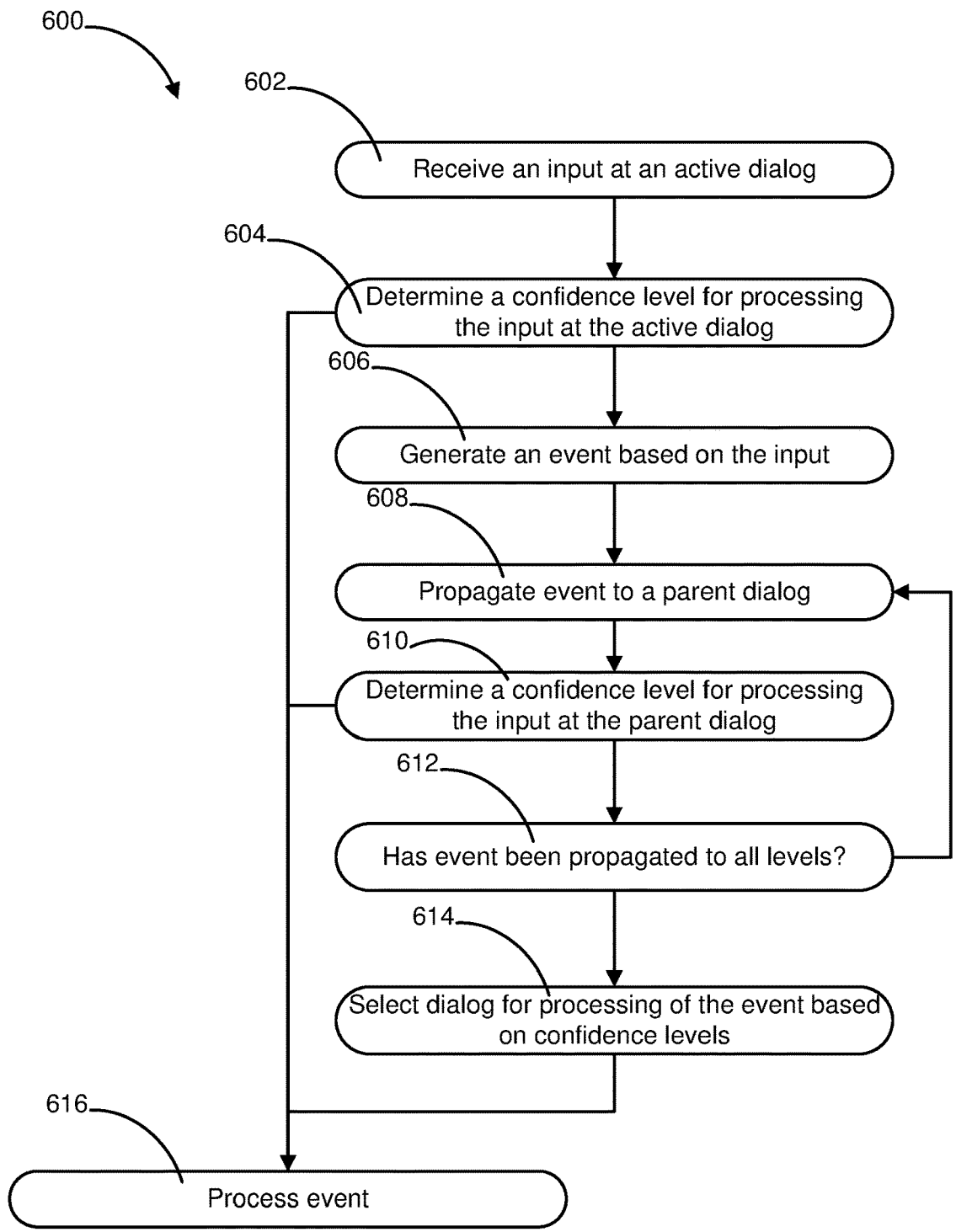
FIG. 6 illustrates example operations for conversational event modeling by a conversational system.

With further reference to FIG. 6, example operations 600 for event modeling to process an input to a conversational system are depicted. A receiving operation 602 may receive an input from a user at an active dialog in the dialog stack of the conversational system. In turn, a determining operation 604 may determine a confidence level for processing the input at the active dialog. The determining operation 604 may comprise any suitable approach to determining the confidence level, which may be representative of a likelihood that the active dialog is best suited within a dialog stack to process the input. The confidence level may be qualitative or quantitative. In regard the former, a plurality of confidence states may be generated that define different relative confidence values.

For instance, the determining operation 604 may include applying a recognizer for the active dialog to the input. The recognizer for an active dialog may attempt to identify at least one of an intent or an entity from the input. In turn, if the recognizer of the active dialog is capable of identifying at least one of an entity or an intent, the active dialog may determine if any conversational rules for the active dialog are associated with the at least one intent or entity identified by the recognizer. If a recognizer is unable to identify either an intent or an entity from the input, a low confidence state may be set as the confidence value. If a recognizer is able to identify an intent, but not an entity, and the intent corresponds to a conversational rule of the dialog, an intermediate confidence state may be set as the confidence value. Likewise, if a recognizer is able to identify an entity, but not an intent, and the entity corresponds to a conversational rule of the dialog, an intermediate confidence state may be set as the confidence value. If an intent and an entity is identified that both match a conversational rule for the active dialog, the confidence level related to the input may be set to a high confidence state.

In an approach, upon determining a high confidence level at the active dialog (e.g., a high confidence state as described above or a confidence value that exceeds some threshold), a processing operation 616 may process the input at the active dialog. For instance, such a high confidence level may be indicative that the input received at the active dialog was an expected input that corresponded to the intent or other function of the active dialog such that there may be little or no ambiguity as to whether the input was responsive to the function of the active dialog. However, if a lower confidence level is determined at the determining operation 604, processing of the event by the active dialog may be delayed and a generating operation 606 may be performed as described in greater detail below. In other approaches, regardless of the confidence level determined in the determining operation 604, the operations may continue. For instance, an event may be generated that sets a parameter related to the propagation of the event such that the event is propagated throughout the dialog stack regardless of the confidence level of any one of the dialogs in the dialog stack. Furthermore, a propagation parameter of an event may define information on resumption of the conversational structure after the processing of the event (e.g., return to active dialog, continue execution of dialog selected for processing the event, return to root dialog, etc.).

The generating operation 606 may generate an event based on the input. The generating operation 606 may include calling a method at the active dialog that generates a system event. The system event generated in the generating operation 606 may comprise a defined schema or format that may be interpretable at other dialogs in the dialog stack. That is, even though an active dialog may exist in different possible conversation structures (e.g., due to different parent dialogs calling the active dialog or different conversation histories creating a unique conversational structure), the event generated at the generating operation 606 may be of a form that may be processed by any other dialog in the dialog stack. In turn, a propagating operation 608 may propagate the event to a parent dialog of the active dialog.

In turn, the parent dialog may receive the event. In turn, a determining operation 610 may be performed at the parent dialog to determine a confidence level for processing the input corresponding to the event at the parent dialog. As described above, in an approach, if the parent dialog determines a high confidence level in the determining operation 610, a processing operation 616 may process the event at the parent dialog in response to the determination of a high confidence level. However, if another (e.g., a lower) confidence level is determined in the determining operation 610, processing of the event by the parent dialog may be delayed and a conditional operation 612 may be performed to determine if all levels of the dialog stack have received the event. In other approaches, regardless of the confidence level determined in the determining operation 610, the conditional operation 612 may be performed.

In the determining operation 610, it may be determined if the event has been propagated to all levels of the dialog stack. If it is determined the event has not been propagated to all levels of the dialog stack, the propagating operation 608 may result in the parent dialog propagating the event to a parent dialog of the parent dialog (or a grandparent dialog to the active dialog). In turn, the operations 600 may include a loop that may be performed until a dialog in the dialog stack determines a sufficiently high level of confidence to proceed to the processing operation 616 or all levels of the dialog stack have received the event.

In the context in which all levels of the dialog stack have received the event, a selecting operation 614 may select a given one of the dialogs to process the event based on the confidence levels generated by the dialogs that received the event. For instance, a dialog with a highest level of confidence may be selected for processing the event such that the processing operation 616 occurs at the dialog with the highest confidence level. However, confidence levels may not include a quantitate value, but rather may be qualitative or conditional. For instance, three states of the confidence level may be provided such as a low confidence state—a dialog cannot process the input associated with the event, an intermediate confidence state—a dialog can process the input with the event but the event is still be propagated to higher levels in the dialog stack, or a high confidence state—a dialog can process the input and the event need not be propagated from the dialog. In this regard, any of these three confidence states may be defined as described above in relation to processing the input with a recognizer. It may be that multiple dialogs in the dialog stack have equal confidence levels corresponding to the intermediate confidence state such that the maximum relative confidence level (e.g., among all dialogs that generated a confidence level for the input) for the dialog stack is shared among multiple dialogs in the stack. In such an instance, any one of a number of different rules or approaches may be imposed such as the dialog nearest to the active dialog having the shared highest confidence level may be selected for executing the processing operation 616. A number of examples of the operations 600 depicted in FIG. 6 are depicted in relation to the example dialog stack discussed above in relation to FIG. 5 in the following description of FIGS. 7-9. Accordingly, unless explicitly stated otherwise, the purpose and function of elements shown in FIGS. 7-9 may be the same or similar to those of like-named elements in FIG. 5.

Figure 7:
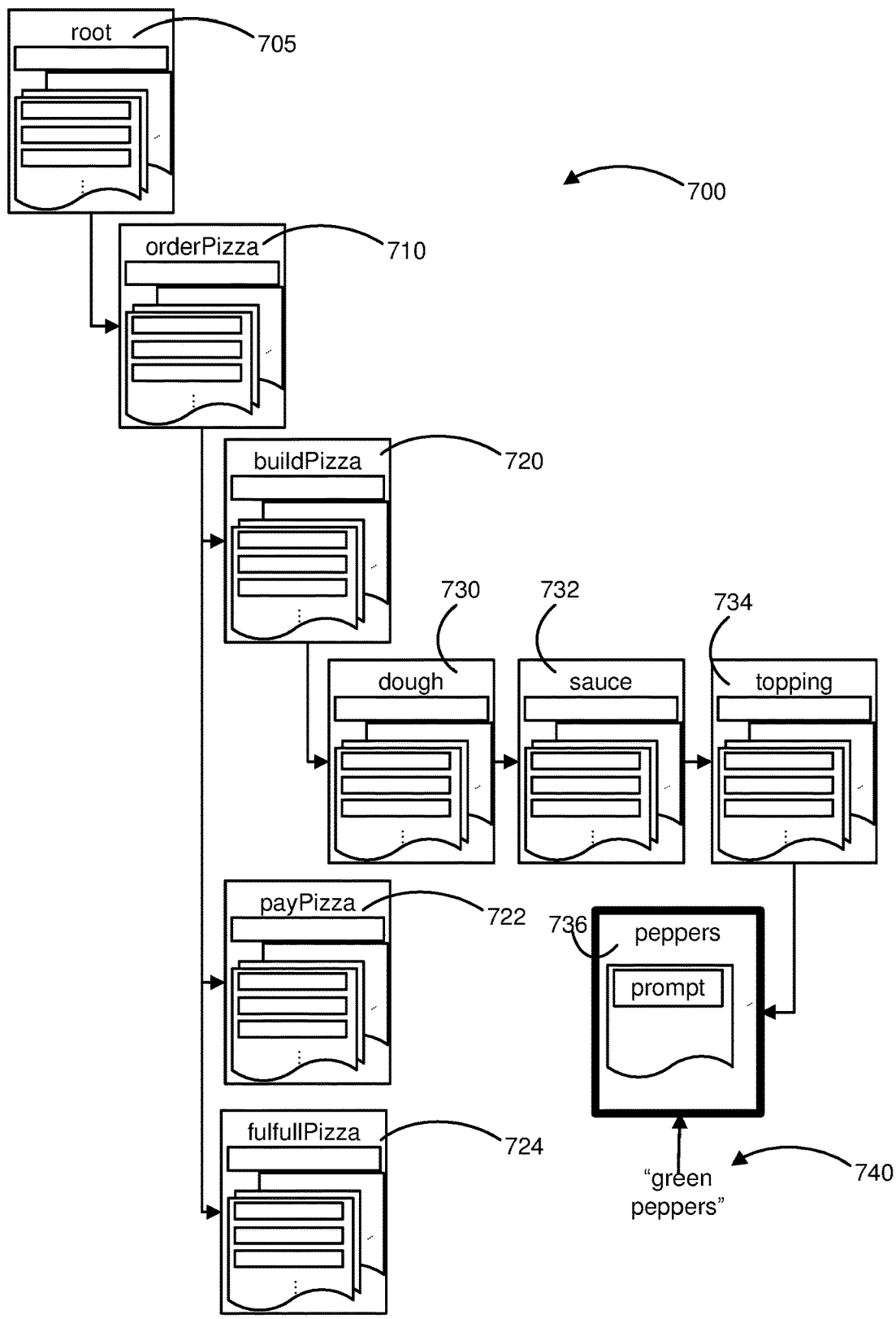
FIGS. 7-9 illustrate example processing of various inputs in a dialog stack of a conversational system.

For instance in FIG. 7, a peppers dialog 736 may be the active dialog in the dialog stack 700. The peppers dialog 736 may comprise a simple prompt to clarify the nature of a request to add peppers to the pizza. For instance, the peppers dialog 736 may provide a prompt, "Would you like green peppers, red peppers, or jalapeno peppers?" In turn, an input 740 of "green peppers" may be received at the pepper dialog 736. The pepper dialog 736 may determine a high confidence level that the input 740 was targeted to the pepper dialog 736 as the input corresponds to one of the limited three responses acceptable to the prompt of the pepper dialog 736. In this case, the pepper dialog 736 may process the input 740 by writing green peppers to memory for the pizza order without propagating an event corresponding to the input 740 to higher level dialogs.

Figure 8:
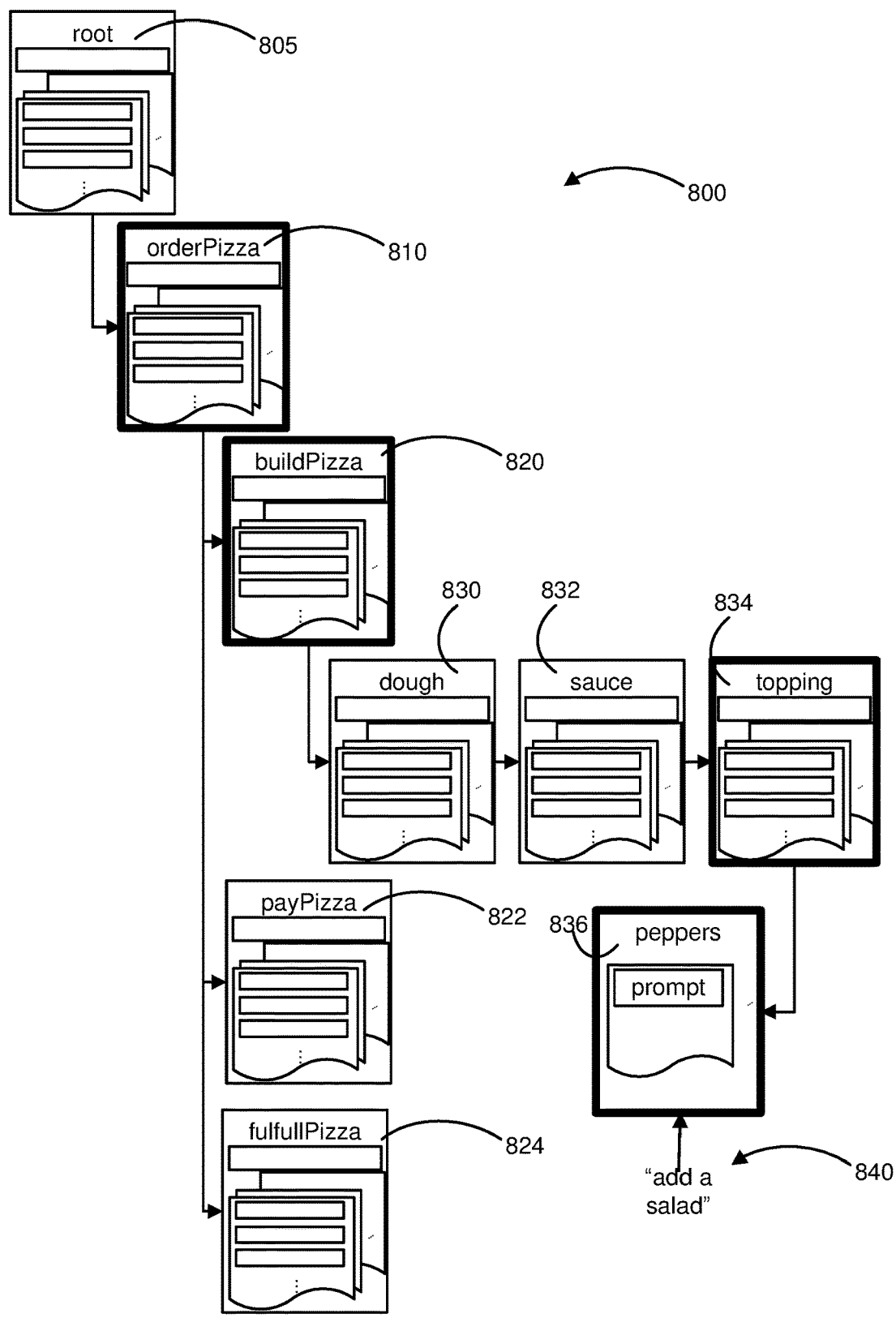

In FIG. 8, an input 840 of "add a salad" may be received at the pepper dialog 836. As discussed above, the pepper dialog 836 may comprise a simple prompt capable of confirming one of three limited choices. Accordingly, upon receipt of the input 840, it may be determined that the pepper dialog 836 has a low confidence level regarding processing the input 840. In fact, the pepper dialog 836 may be incapable of processing the input 840. For instance, the pepper dialog 836 may not include a recognizer due to the simplicity of the prompt for the pepper dialog 836. In turn, the pepper dialog 836 may generate an event based on the input 840. The event may include various parameters, which may be provided in a schema or other format that is parsable and/or interpretable by the other dialogs in the dialog stack 800. For instance, the event may have a name, input value, and/or one or more propagating parameters. The propagating parameter may define a threshold confidence value above which a dialog will process the event without further propagation of the event. The propagating parameter may define that an event is to be propagated throughout the dialog stack such that no intermediate dialog in the dialog stack can process the event until all levels of the dialog stack have received the event.

In turn, the event generated by the pepper dialog 836 may be propagated to the topping dialog 834, which is a parent dialog to the pepper dialog 836. The topping dialog 834 may comprise a recognizer capable of processing the input 840 to attempt to identify an entity or intent from the input 840. In turn, the topping dialog 834 may identify an intent "addItem" and an entity "itemSalad" from the input 840. In turn, the topping dialog 834 may determine if any conversational rules in the topping dialog 834 correspond to the addItem intent for the entity itemSalad. In this case, it may be that no conversational rules for the topping dialog 834 correspond to the addItem intent for the entity itemSalad. Alternatively, the topping dialog 834 may not be able to identify an intent or entity from the input 840. In either instance of not identifying an intent or entity or not matching any conversational rules to a trigger from the recognizer, the confidence level of the topping dialog 834 may be low. In turn, topping dialog 834 may propagate the event to the buildPizza dialog 820.

In turn, the buildPizza dialog 820 may also determine a low confidence level for the input 840. As such, the buildPizza dialog 820 may propagate the event to the orderPizza dialog 810. The orderPizza dialog 810 may be operative to identify the addItem intent and itemSalad entity from the input 840. Moreover, the orderPizza dialog 810 may have a conversational rule that matches the addItem intent and the itemSalad entity. Specifically, this combination of intent and entity may result in calling a buildSalad dialog (not shown) by the orderPizza dialog 810. In turn, as the orderPizza dialog 810 may match the intent and entity of the input 840 to a conversation rule at the orderPizza dialog 810, the orderPizza dialog 810 may have a high confidence level. For instance, the confidence level at the orderPizza dialog 810 may rise to the high confidence state for the confidence level described above. In turn, the orderPizza dialog 810 may process the input 840 and call the buildSalad dialog as described above. In turn, the event may not be propagated any higher in the dialog stack 800 based on the high confidence level for the orderPizza dialog 810.

Figure 9:
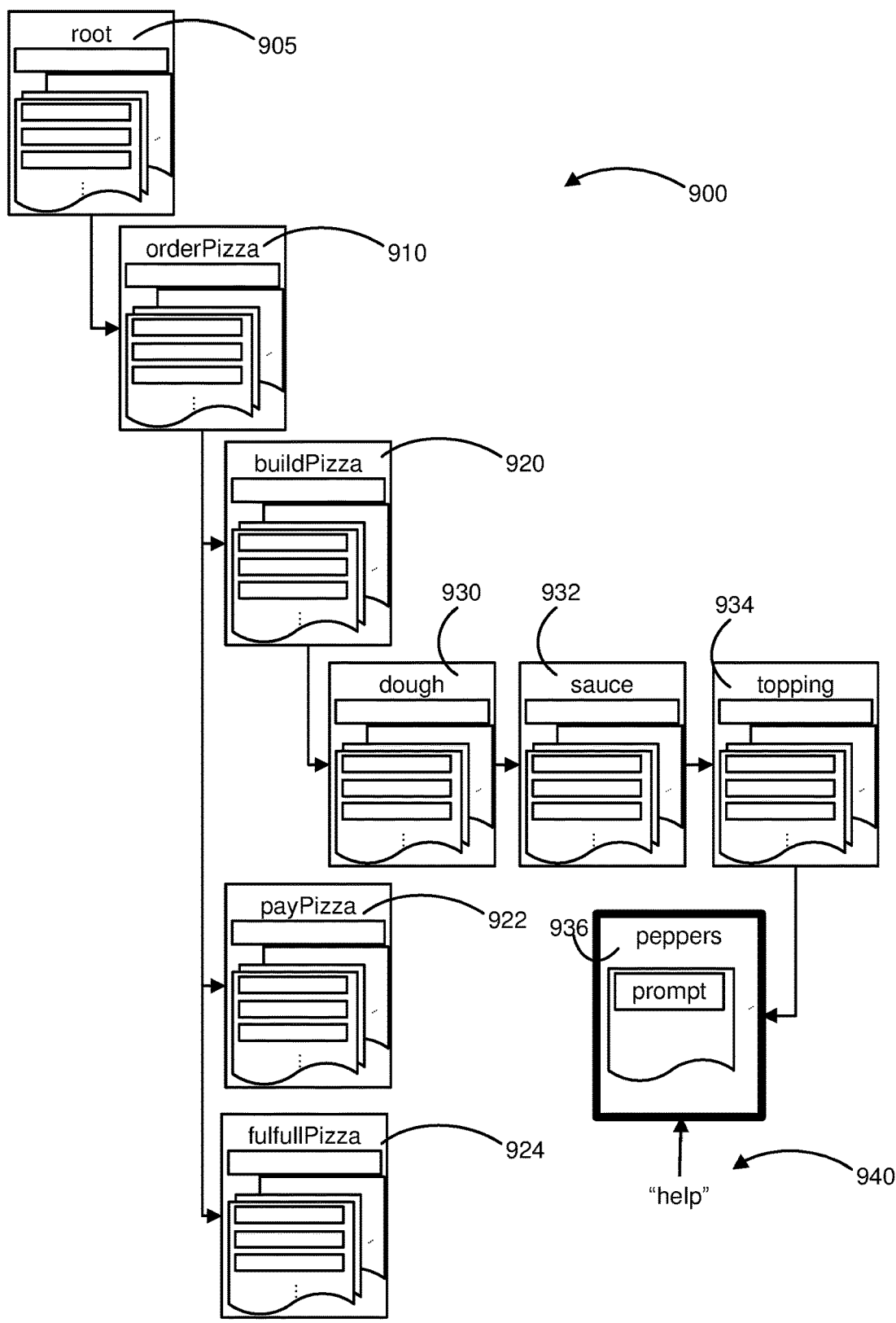

In FIG. 9, an input 940 of "help." May be received. As described above, a pepper dialog 936 may be a relatively simple dialog comprising a prompt for confirming a kind of pepper a use wishes to add to their pizza order. In this regard, the pepper dialog 936 may not be capable of processing the "help" input 940. In this regard, an event may be generated corresponding to the "help" input 940 that is passed to the toppings dialog 934, which is the parent dialog for the pepper dialog 936.

The topping dialog 934 may receive the event and process the input 940 corresponding therewith. For instance, the topping dialog 934 may process the input 940 with a recognizer of the topping dialog 934. In this regard, the topping dialog 934 may identify a conversational rule within the topping dialog 934 that may correspond to the input 940. However, in this example, the conversational rule identified for the "help" input 940 may not generate a high confidence level. That is, an intermediate confidence state for the confidence level as described above may be generated such that the topping dialog 934 is capable of processing the input 940, but the event may be further propagated up the dialog stack 900.

Accordingly, the event may be passed to the buildPizza dialog 920. The buildPizza dialog 920 may process the input 940 corresponding to the event, such as by applying a recognizer to the input 940. Like the topping dialog 934, the buildPizza dialog 920 may determine an intermediate confidence level (e.g., state 2) such that the buildPizza dialog 920 identifies a conversational rule that could be applied, but still passes the event to the parent dialog of the buildPizza dialog 920. In turn, the event may be passed to the orderPizza dialog 910.

The orderPizza dialog 910 may also process the event by applying a recognizer to the input 940. Again, the orderPizza dialog 910 may determine that the orderPizza dialog 910 is capable of processing the input 940, but may still pass the event to the root dialog 905. The root dialog 905 may also process the input 940 associated with the event (e.g., using a recognizer) to determine that it is capable of processing the input 940, but not at a high confidence level.

Accordingly, in the scenario presented in FIG. 9, the event created for the input 940 may be passed from the active dialog or leaf dialog through all levels of the dialog stack 900. Within the chain of dialogs of the dialog stack 900 through which the event is propagated, a number of dialogs may have a common maximum relative confidence level, but none of the dialogs may have a high confidence level. That is, multiple levels of the dialog stack may have dialogs that are capable of processing the input 940, but not at a high confidence level.

In turn, a number of approaches may be applied to selecting which of the dialogs in the dialog stack 900 to use to process the input 940. In one approach, the confidence levels of the dialogs in the dialog stack 900 that received the event may be compared by a computer-executed conversational system that is executing the dialog stack 900. That is, while a three state confidence level approach is described above, other examples may include further granularity in relation to the confidence level values such that one or more of the dialogs in the dialog stack 900 may have a higher confidence level than others, even though none of the dialogs generated a confidence level that results in processing of the input 940 without further propagation. In this case, the dialog with the highest confidence value may be selected for use in processing the input 940.

It may also be the case that one or more of the dialogs in the dialog stack 900 may have the same confidence value, which corresponds to the highest confidence value in the dialog stack 900. For instance, in the example described above, each of the topping dialog 934, buildPizza dialog 920, orderPizza dialog 910, and root dialog 905 may have an intermediate confidence state for the respective confidence levels of the dialogs. Accordingly, each of these dialogs may be tied for a maximum relative confidence value comprising the intermediate confidence state. In this situation, the dialog of the plurality of dialogs having a tied confidence value that is nearest the active dialog (i.e., the pepper dialog 936) may be selected for processing the input 940. This may be at least in part based on an understanding of the dialog stack 900 in that a child dialog in a stack is generally more specific than the parent. That is, a child dialog tends to have more granular information, request more specific information, or provide more detailed functionality than a parent dialog. In this regard, dialogs toward the "bottom" of the dialog stack 900 or nearer the active dialog tend to be more specific. In this regard, by selecting the dialog nearest the active dialog or nearest the bottom of the dialog stack 900 from the plurality of dialogs having a tied highest confidence level, the input 940 may be processed with the most specific dialog capable of processing the input 940 having the highest confidence level in the dialog stack 900.

Figure 10:
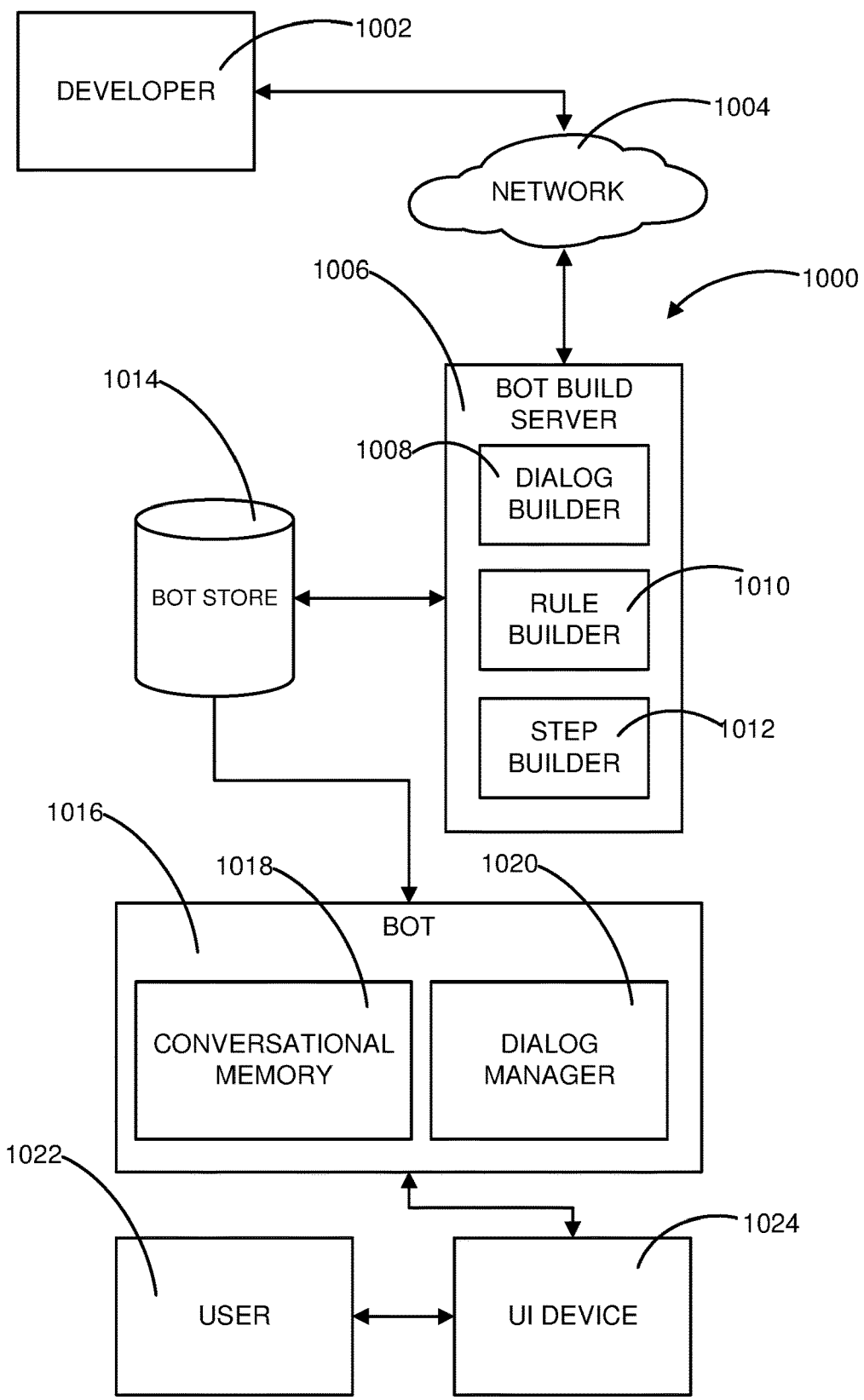
FIG. 10 illustrates an example computing system including a bot building server platform for designing and publishing bots according to examples described herein.

FIG. 10 is a simplified block diagram of a computing system 1000 including a bot building server platform 1006 for designing and publishing bots in an example. As illustrated in FIG. 10, developers 1002 may use computing devices, such as general computing devices, tablet computing devices, mobile computing device, or the like, to access the bot building server platform 1006 via network 1004, which may be the Internet, a local network, a wide area network, or the like. In sample embodiments, the bot building server platform 1006 includes dialog building platform 1008 for creating dialogs for respective applications implementing the created bot. The bot building server platform 1006 may also include a rule building platform 1010 for creating rules as described above including a condition and steps to execute. The bot building server platform 1006 may also include a step building platform 1012 for creating steps that execute functionality as described above. In this regard, the bot building server platform 1006 may provide declarative file components for generation of dialogs, rules, and/or steps. This may allow developers to easily develop bots by plugging predefined or populatable elements from the bot building server platform 1006. For instance, the declarative file formats may comprise a schema (e.g., XML, JSON, etc.) that provides structure for developing dialogs, rules, and/or steps. In this regard, the dialogs, rules, and/or steps may further be extensible by a developer 1002. The bot building server platform 1006 provides an appropriate schema to dialog building platform 1008, rule building platform 1010, and step building platform 1012 to create the desired dialogs for the bots being created by the developers. The created bots are stored in bot store 1014 for publishing to different bot communication channels for interaction with users 1022 via a user interface device 1024 as described above. For example, the communication channels for the bot dialog may include directory services, a web portal, mailbox services, instant message stores, social networking services, virtual assistants, and other services that may implement dialogs via bots. The bot 1016 so created and published may be a bot of the type described above. The bot 1016 may include a dialog manager 1020, which may maintain the plan of the conversational system. The bot 1016 may also include a conversational memory 1018. Content provided by users when interacting with the bot 1016 may be stored in the conversational memory 1018 for processing by the dialog manager 1020. By way of example, the bot building server platform 1006 may be implemented in a general computing device.

Figure 11:
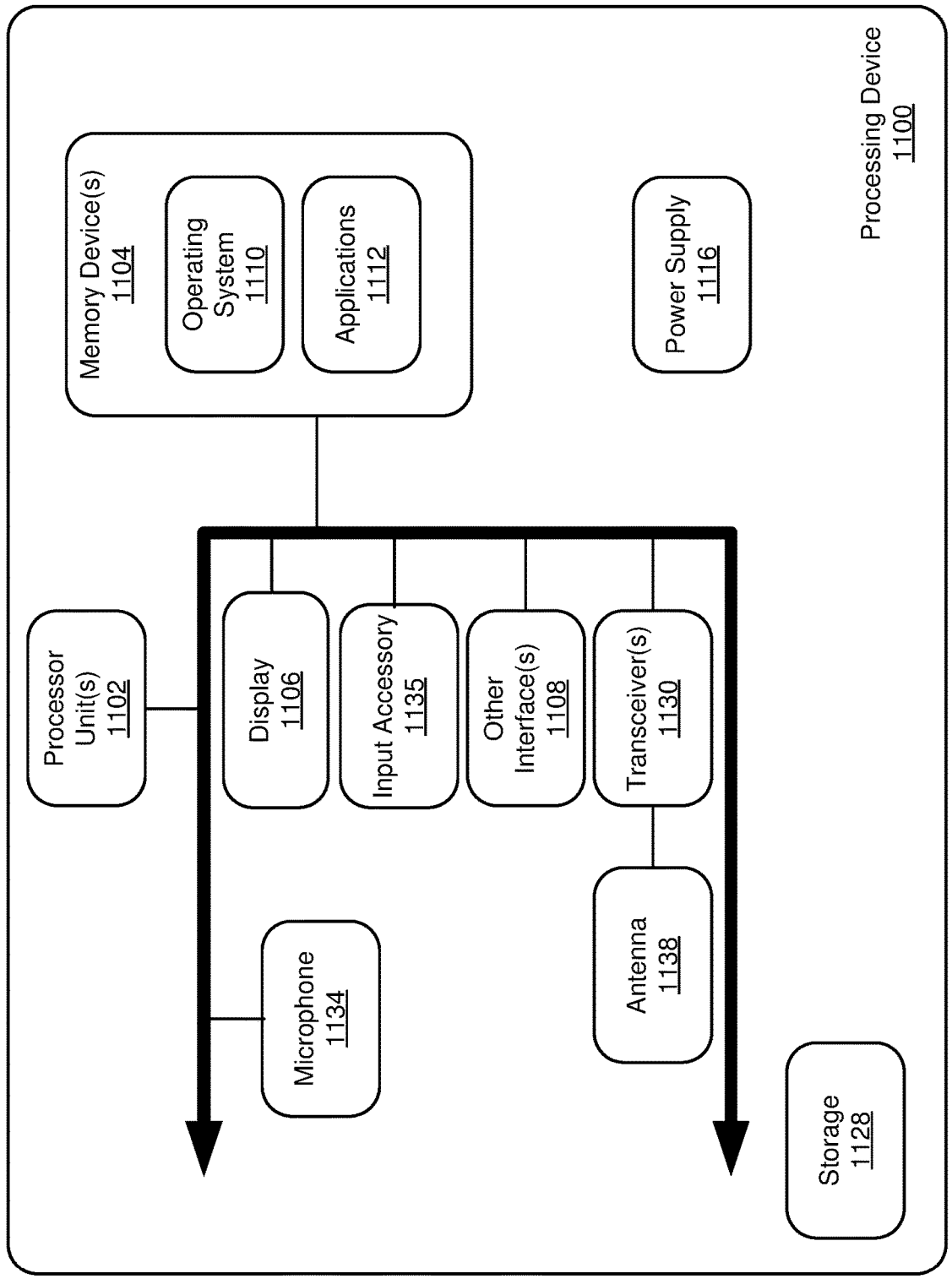
FIG. 11 illustrates an example schematic of a processing device suitable for implementing aspects of the disclosed technology.

FIG. 11 illustrates an example schematic of a processing device 1100 suitable for implementing aspects of the disclosed technology including a computer-executed conversational system. The processing device 1100 includes one or more processor unit(s) 1102, memory 1104, a display 1106, and other interfaces 1108 (e.g., buttons). The memory 1104 generally includes both volatile memory (e.g., RAM) and non-volatile memory (e.g., flash memory). An operating system 1110, such as the Microsoft Windows® operating system, the Microsoft Windows® Phone operating system or a specific operating system designed for a gaming device, resides in the memory 1104 and is executed by the processor unit(s) 1102, although it should be understood that other operating systems may be employed.

One or more applications 1112 are loaded in the memory 1104 and executed on the operating system 1110 by the processor unit(s) 1102. Applications 1112 may receive input from various input local devices such as a microphone 1134, input accessory 1135 (e.g., keypad, mouse, stylus, touchpad, gamepad, racing wheel, joystick). Additionally, the applications 1112 may receive input from one or more remote devices such as remotely-located smart devices (e.g., smart devices 102 and 104 in FIG. 1) by communicating with such devices over a wired or wireless network using more communication transceivers 1130 and an antenna 1138 to provide network connectivity (e.g., a mobile phone network, Wi-Fi®, Bluetooth®). The processing device 1100 may also include various other components, such as a positioning system (e.g., a global positioning satellite transceiver), one or more accelerometers, one or more cameras, an audio interface (e.g., the microphone 1134, an audio amplifier and speaker and/or audio jack), and storage devices 1128. Other configurations may also be employed.

The processing device 1100 further includes a power supply 1116, which is powered by one or more batteries or other power sources and which provides power to other components of the processing device 1100. The power supply 1116 may also be connected to an external power source (not shown) that overrides or recharges the built-in batteries or other power sources.

In an example implementation, a conversational system may include hardware and/or software embodied by instructions stored in the memory 1104 and/or the storage devices 1128 and processed by the processor unit(s) 1102. The memory 1104 may be the memory of a host device or of an accessory that couples to the host.

The processing device 1100 may include a variety of tangible computer-readable storage media and intangible computer-readable communication signals. Tangible computer-readable storage can be embodied by any available media that can be accessed by the processing device 1100 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 1100. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of conversational event modeling for control of a conversational system, including: receiving an input at an active dialog in a dialog stack of a conversational model, the dialog stack including a plurality of levels of dialogs; generating an event at the active dialog based on the input; propagating the event to a plurality of dialogs at different respective levels within the dialog stack; and selecting one of the plurality of dialogs to process the event. Other embodiments of this aspect include corresponding computer systems, apparatus, and computer programs recorded on one or more computer storage devices, each configured to perform the actions of the methods.

Implementations may include one or more of the following features. The method further including: determining at each dialog of the plurality of dialogs a confidence level related to processing the event, where the selecting is at least partially based on the confidence level of each dialog of the plurality of dialogs. The method where at least two dialogs of plurality of dialogs have equal confidence levels, and where the selecting includes: choosing a dialog nearest the active dialog in the dialog stack from the at least two dialogs for processing the event. The method further including: identifying at least one of an intent or an entity for the event with a recognizer of each dialog of the plurality of dialogs in response to receiving the event, where the confidence level for each dialog is at least partially based on the at least one of the intent or the entity relative to one or more conversational rules of the dialog. The method further including: controlling the propagating of the event in the dialog stack based on an event control parameter at a dialog. The method where the input corresponds to at least one of a cancel function or a help function. The method where the propagating includes passing the event from a child dialog to a parent dialog in the dialog stack. Implementations of the described techniques may include hardware, a method or process, or computer software on a computer-accessible medium.

One general aspect includes one or more tangible processor-readable storage media embodied with instructions for executing on one or more processors and circuits of a device a process for conversational event modeling in a computer-executed conversational system executed by one or more processors, the process including: receiving an input at an active dialog in a dialog stack of a conversational model, the dialog stack including a plurality of levels of dialogs; generating an event at the active dialog based on the input; propagating the event to a plurality of dialogs at different respective levels within the dialog stack; and selecting one of the plurality of dialogs to process the event. Other embodiments of this aspect include corresponding computer systems, apparatus, and computer programs recorded on one or more computer storage devices, each configured to perform the actions of the methods.

Implementations may include one or more of the following features. The one or more tangible processor-readable storage media further including: determining at each dialog of the plurality of dialogs a confidence level related to processing the event, where the selecting is at least partially based on the confidence level of each dialog of the plurality of dialogs. The one or more tangible processor-readable storage media where at least two dialogs of plurality of dialogs have equal confidence levels, and where the selecting includes: choosing a dialog nearest the active dialog in the dialog stack from the at least two dialogs for processing the event. The one or more tangible processor-readable storage media further including: identifying at least one of an intent or an entity for the event with a recognizer of each dialog of the plurality of dialogs in response to receiving the event, where the confidence level for each dialog is at least partially based on the at least one of the intent or the entity relative to one or more conversational rules of the dialog. The one or more tangible processor-readable storage media further including: controlling the propagating of the event in the dialog stack based on an event control parameter at a dialog. The one or more tangible processor-readable storage media where the input corresponds to at least one of a cancel function or a help function. The one or more tangible processor-readable storage media where the propagating includes passing the event from a child dialog to a parent dialog in the dialog stack. Implementations of the described techniques may include hardware, a method or process, or computer software on a computer-accessible medium.

One general aspect includes a system including: one or more processors; a conversational event modeling module executed by the one or more processors to maintain a conversational model including a dialog stack in a memory of the system. The conversational event modeling module may be operative to receive an input at an active dialog in the dialog stack of the conversational model, the dialog stack including a plurality of levels of dialogs; generate an event at the active dialog based on the input, propagate the event to a plurality of dialogs at different respective levels within the dialog stack; and select one of the plurality of dialogs to process the event. Other embodiments of this aspect include corresponding computer systems, apparatus, and computer programs recorded on one or more computer storage devices, each configured to perform the actions of the methods.

Implementations may include one or more of the following features. The system where the conversational event modeling module is further operative to: determine at each dialog of the plurality of dialogs a confidence level related to processing the event, where selection of the one of the plurality of dialogs is at least partially based on the confidence level of each dialog of the plurality of dialogs. The system where at least two dialogs of plurality of dialogs have equal confidence levels, and where the conversational event modeling module is further operative to: choose a dialog nearest the active dialog in the dialog stack from the at least two dialogs for processing the event. The system where the conversational event modeling module is further operative to: identify at least one of an intent or an entity for the event with a recognizer of each dialog of the plurality of dialogs in response to receiving the event, where the confidence level for each dialog is at least partially based on the at least one of the intent or the entity relative to one or more conversational rules of the dialog. The system where the conversational event modeling module is further operative to: control propagation of the event in the dialog stack based on an event control parameter at a dialog. The system where propagation includes passing the event from a child dialog to a parent dialog in the dialog stack. Implementations of the described techniques may include hardware, a method or process, or computer software on a computer-accessible medium.

One general aspect includes a conversation system for conversational event modeling. The system includes a means for receiving an input at an active dialog in a dialog stack of a conversational model. The dialog stack includes a plurality of levels of dialogs. The system also includes a means for generating an event at the active dialog based on the input. The system also includes a means for propagating the event to a plurality of dialogs at different respective levels within the dialog stack and a means for selecting one of the plurality of dialogs to process the event. Implementations of this aspect may include one or more of the features described in relation to the foregoing aspects.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of conversational event modeling for control of a conversational system, comprising:
receiving an input at an active dialog in a dialog stack of a conversational model, the dialog stack comprising a plurality of levels of dialogs that are each independently configured to process events generated by the conversational model;
generating an event at the active dialog based on the input;
propagating the event to a plurality of dialogs at different respective levels within the dialog stack; and
selecting one of the plurality of dialogs to process the event.

2. The method of claim 1, further comprising:
determining at each dialog of the plurality of dialogs a confidence level related to processing the event, wherein the selecting is at least partially based on the confidence level of each dialog of the plurality of dialogs.

3. The method of claim 2, wherein at least two dialogs of plurality of dialogs have equal confidence levels, and wherein the selecting comprises:
choosing a dialog nearest the active dialog in the dialog stack from the at least two dialogs for processing the event.

4. The method of claim 2, further comprising:
identifying at least one of an intent or an entity for the event with a recognizer of each dialog of the plurality of dialogs in response to receiving the event, wherein the confidence level for each dialog is at least partially based on the at least one of the intent or the entity relative to one or more conversational rules of the dialog.

5. The method of claim 1, further comprising:
controlling the propagating of the event in the dialog stack based on an event control parameter at a dialog.

6. The method of claim 1, wherein the input corresponds to at least one of a cancel function or a help function.

7. The method of claim 1, wherein the propagating comprises passing the event from a child dialog to a parent dialog in the dialog stack.

8. One or more tangible processor-readable storage media embodied with instructions for executing on one or more processors and circuits of a device a process for conversational event modeling in a computer-executed conversational system executed by one or more processors, the process comprising:
receiving an input at an active dialog in a dialog stack of a conversational model, the dialog stack comprising a plurality of levels of dialogs that are each independently configured to process events generated by the conversational model;
generating an event at the active dialog based on the input;
propagating the event to a plurality of dialogs at different respective levels within the dialog stack; and
selecting one of the plurality of dialogs to process the event.

9. The one or more tangible processor-readable storage media of claim 8, further comprising:
determining at each dialog of the plurality of dialogs a confidence level related to processing the event, wherein the selecting is at least partially based on the confidence level of each dialog of the plurality of dialogs.

10. The one or more tangible processor-readable storage media of claim 9, wherein at least two dialogs of plurality of dialogs have equal confidence levels, and wherein the selecting comprises:
choosing a dialog nearest the active dialog in the dialog stack from the at least two dialogs for processing the event.

11. The one or more tangible processor-readable storage media of claim 9, further comprising:
identifying at least one of an intent or an entity for the event with a recognizer of each dialog of the plurality of dialogs in response to receiving the event, wherein the confidence level for each dialog is at least partially based on the at least one of the intent or the entity relative to one or more conversational rules of the dialog.

12. The one or more tangible processor-readable storage media of claim 8, further comprising:
controlling the propagating of the event in the dialog stack based on an event control parameter at a dialog.

13. The one or more tangible processor-readable storage media of claim 8, wherein the input corresponds to at least one of a cancel function or a help function.

14. The one or more tangible processor-readable storage media of claim 8, wherein the propagating comprises passing the event from a child dialog to a parent dialog in the dialog stack.

15. A system comprising:
one or more processors;
a conversational event modeling module executed by the one or more processors to maintain a conversational model comprising a dialog stack in a memory of the system, the conversational event modeling module operative to:
receive an input at an active dialog in the dialog stack of the conversational model, the dialog stack comprising a plurality of levels of dialogs that are each independently configured to process events generated by the conversational model;
generate an event at the active dialog based on the input;
propagate the event to a plurality of dialogs at different respective levels within the dialog stack; and
select one of the plurality of dialogs to process the event.

16. The system of claim 15, wherein the conversational event modeling module is further operative to:
determine at each dialog of the plurality of dialogs a confidence level related to processing the event, wherein selection of the one of the plurality of dialogs is at least partially based on the confidence level of each dialog of the plurality of dialogs.

17. The system of claim 16, wherein at least two dialogs of plurality of dialogs have equal confidence levels, and wherein the conversational event modeling module is further operative to:
choose a dialog nearest the active dialog in the dialog stack from the at least two dialogs for processing the event.

18. The system of claim 16, wherein the conversational event modeling module is further operative to:
identify at least one of an intent or an entity for the event with a recognizer of each dialog of the plurality of dialogs in response to receiving the event, wherein the confidence level for each dialog is at least partially based on the at least one of the intent or the entity relative to one or more conversational rules of the dialog.

19. The system of claim 15, wherein the conversational event modeling module is further operative to:
control propagation of the event in the dialog stack based on an event control parameter at a dialog.

20. The system of claim 15, wherein propagation comprises passing the event from a child dialog to a parent dialog in the dialog stack.

* * * * *